United States Patent
Kemisetti et al.

(10) Patent No.: US 12,045,910 B2
(45) Date of Patent: Jul. 23, 2024

(54) TECHNIQUE TO OPTIMIZE POWER AND PERFORMANCE OF XR WORKLOAD

(71) Applicant: QUALCOMM Incorporated, San Diego, CA (US)

(72) Inventors: Rajesh Kemisetti, Hyderabad (IN); Puranam V G Tejaswi, Hyderabad (IN); Kamal Agrawal, Sohela (IN)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 17/663,637

(22) Filed: May 16, 2022

(65) Prior Publication Data

US 2023/0368325 A1 Nov. 16, 2023

(51) Int. Cl.
*G06T 1/20* (2006.01)
*G06F 1/3234* (2019.01)

(52) U.S. Cl.
CPC .............. *G06T 1/20* (2013.01); *G06F 1/3234* (2013.01)

(58) Field of Classification Search
CPC ................................ G06T 1/20; G06F 1/3234
See application file for complete search history.

(56) References Cited

U.S. PATENT DOCUMENTS

| | | | | |
|---|---|---|---|---|
| 9,304,813 B2 * | 4/2016 | Vembu | .................. | G06F 9/4881 |
| 10,769,747 B2 * | 9/2020 | Babu | ....................... | G06F 3/011 |
| 10,999,797 B2 * | 5/2021 | Samson | .................. | G06F 1/324 |
| 11,127,106 B2 * | 9/2021 | Ramadoss | ................. | G06T 1/60 |
| 2016/0077575 A1 * | 3/2016 | Paul | ....................... | G06F 1/3228 |
| | | | | 713/323 |
| 2017/0199558 A1 * | 7/2017 | Farazmand | ........... | G06F 1/3296 |
| 2017/0212563 A1 * | 7/2017 | Farazmand | ........... | G06F 9/5027 |
| 2019/0138081 A1 * | 5/2019 | Zeng | ...................... | G06F 1/3228 |
| 2021/0200255 A1 * | 7/2021 | Alla | ....................... | G06F 1/324 |

FOREIGN PATENT DOCUMENTS

EP 3401757 A1 11/2018

OTHER PUBLICATIONS

International Search Report and Written Opinion—PCT/US2023/021587—ISA/EPO—Sep. 20, 2023.

\* cited by examiner

*Primary Examiner* — Xin Sheng
(74) *Attorney, Agent, or Firm* — Procopio, Cory, Hargreaves & Savitch (57) ABSTRACT

This disclosure provides systems, devices, apparatus, and methods, including computer programs encoded on storage media, for optimizing power and performance of XR workloads. A graphics processor may receive, from an application, an indication of a time period for a timer associated with exiting an IFPC state. The graphics processor may process, upon triggering the timer associated with exiting the IFPC state, one or more predefined workloads. The graphics processor may initiate the IFPC state upon the one or more predefined workloads being finished processing. The graphics processor may exit the IFPC state upon detecting an expiration of the timer.

30 Claims, 8 Drawing Sheets

TECHNIQUE TO OPTIMIZE POWER AND PERFORMANCE OF XR WORKLOAD

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques may not address the performance penalty associated with the inter-frame power collapse (IFPC) exit delay at the GPU when the GPU processes fixed periodical workloads. There is a need for improved power collapsing techniques.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive, from an application, an indication of a time period for a timer associated with exiting an inter-frame power collapse (IFPC) state. The apparatus may process, upon triggering the timer associated with exiting the IFPC state, one or more predefined workloads. The apparatus may initiate the IFPC state upon the one or more predefined workloads being finished processing. The apparatus may exit the IFPC state upon detecting an expiration of the timer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

When IFPC (e.g., power collapsing the GPU between command submissions when the GPU is idle) is utilized at a GPU, the IFPC exit latency may cause an unnecessary performance penalty when the GPU acts as a fixed function block and processes fixed periodical workloads. Further, the hysteresis timeout associated with the IFPC may be superfluous when the GPU processes such fixed periodical workloads. The superfluous hysteresis timeout may be associated with unnecessary power consumption. According to one or more aspects, a hint relating to a timer value may be provided to the graphics management unit (GMU) firmware. As a result, hysteresis timeout that is unnecessary for fixed periodical workloads may be avoided. Furthermore, the timeline associated with the waking up of the GPU may be advanced based on a timer such that the delay between the receipt of an inter-processor communication controller (IPCC) interrupt and the time the GPU becomes awake and ready to process a command may be eliminated. The elimination of the delay may bring about performance benefits.

Figure 1:
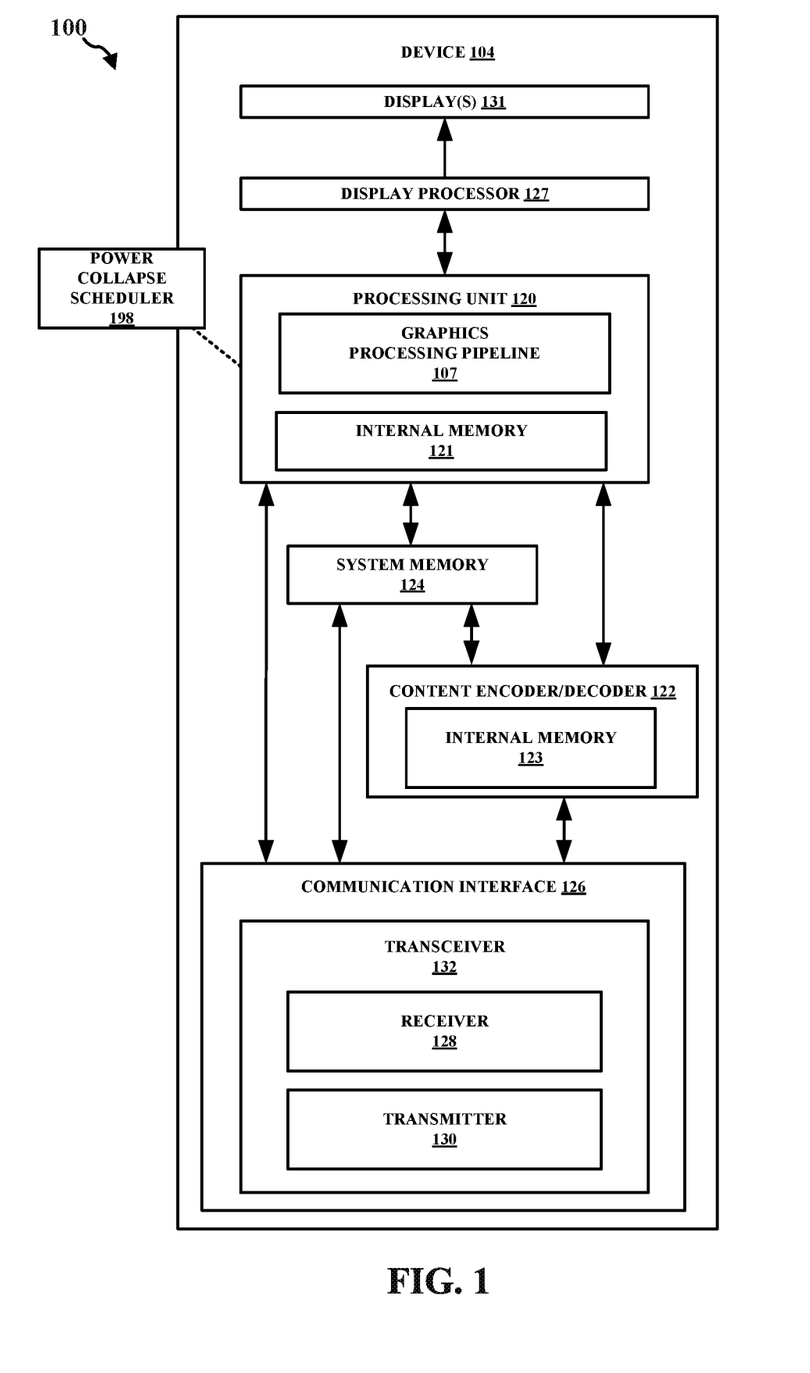
FIG. 1 is a block diagram that illustrates an example content generation system in accordance with one or more techniques of this disclosure.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a power collapse scheduler 198 configured to receive, from an application, an indication of a time period for a timer associated with exiting an IFPC state. The power collapse scheduler 198 may be configured to process, upon triggering the timer associated with exiting the IFPC state, one or more predefined workloads. The power collapse scheduler 198 may be configured to initiate the IFPC state upon the one or more predefined workloads being finished processing. The power collapse scheduler 198 may be configured to exit the IFPC state upon detecting an expiration of the timer. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
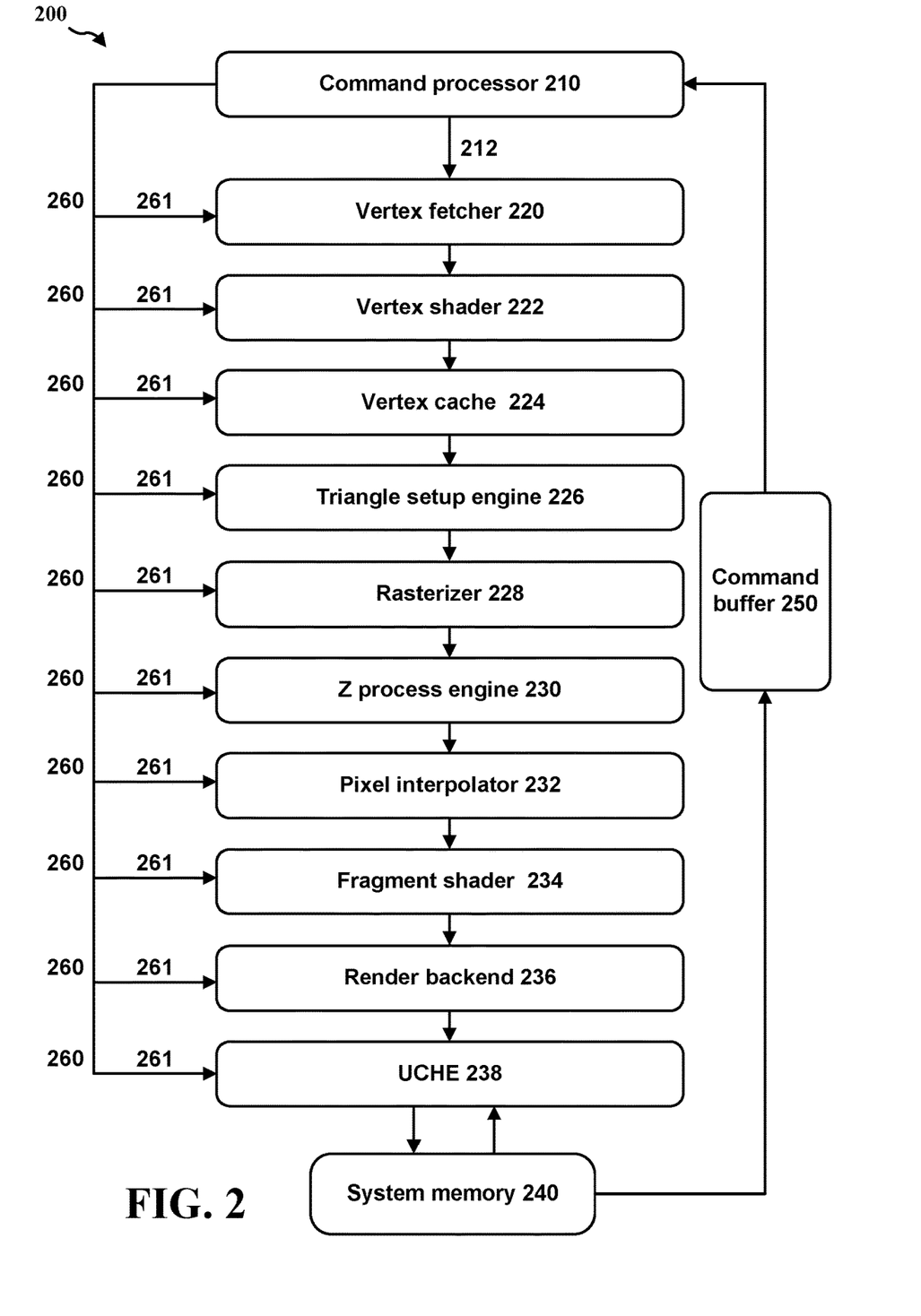
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

In an extended reality (XR) pipeline, the full data path may include two SoCs associated with two devices. A companion device may generate the visual content, and may send the visual content to an XR device. The XR device may then perform such operations as a late stage reprojection (LSR) for a final display based on the user's latest head pose. In particular, the LSR may be a feature that may ensure the responsiveness of an XR headset to user motion. The LSR may help to reduce the perceived input lag and enhance user experience. As part of the LSR, a previously rendered frame may be reprojected or warped into a prediction of what a normally rendered frame would look like using newer motion information from the headset sensors. In particular, a GPU in the XR device may be used to generate a motion vector (MV) grid using one or more of the depth, the render pose, or the latest head pose details.

The XR pipeline may be used to process the head motion (e.g., translation and rotation) or to perform optical correction. In one or more examples hereinafter, a reference to XR may also include a reference to augmented reality (AR) or virtual reality (VR).

Figure 3:
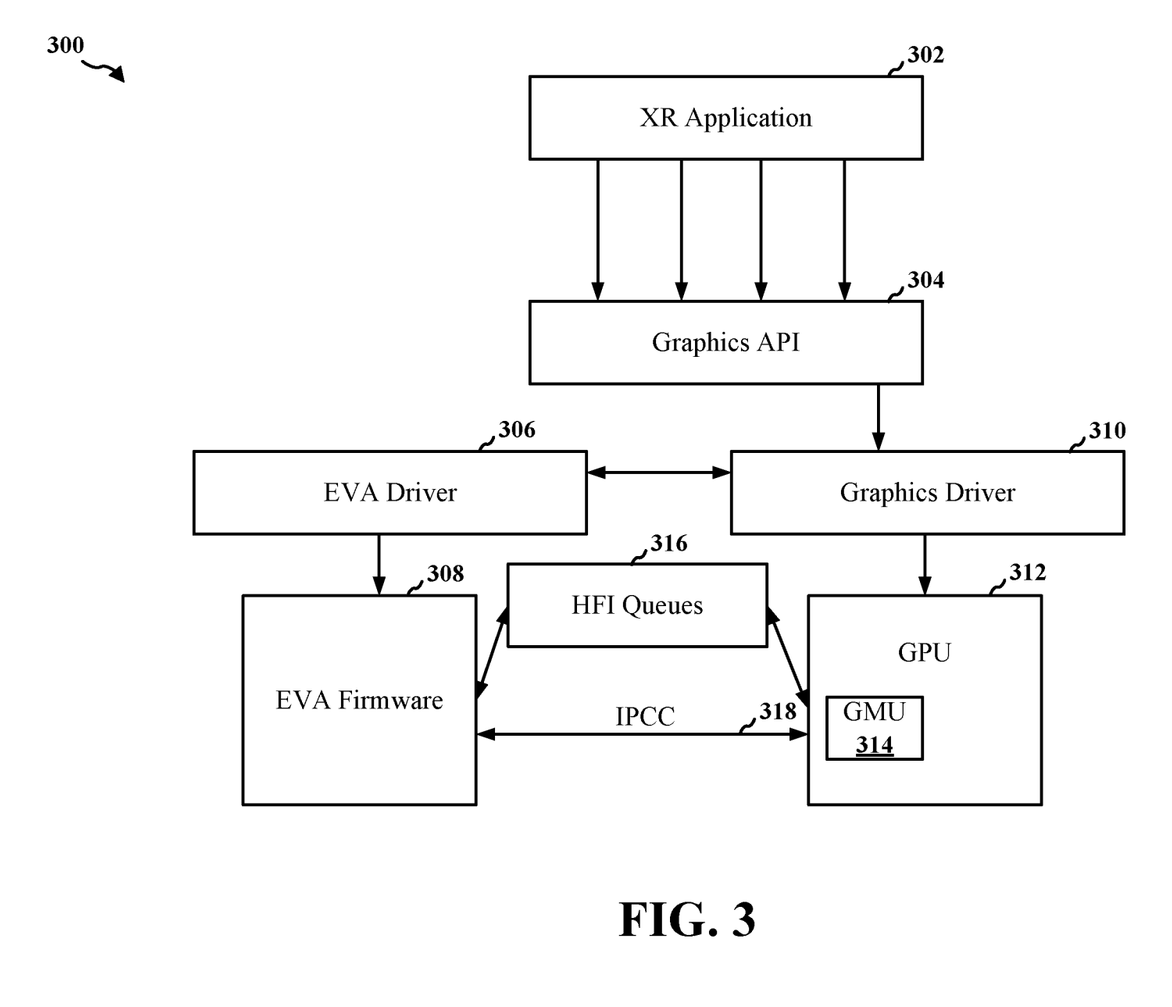
FIG. 3 is a block diagram illustrating an example environment in which aspects of the disclosure may be practiced.

FIG. 3 is a block diagram 300 illustrating an example environment in which aspects of the disclosure may be practiced. In particular, an example XR pipeline is illustrated in FIG. 3. In some configurations, an XR application 302 may use a graphics application programming interface (API) 304 to generate commands associated with the MV grid generation. The graphics driver 310 (e.g., a graphics kernel driver or a kernel graphics support layer (KGSL)) may receive the commands, and may communicate with the enhanced visual analytics (EVA) driver 306 to exchange appropriate data and/or commands associated with the XR pipeline. Further, the EVA firmware 308 may provide depth buffer details to the GPU 312 (e.g., via the host firmware interface (HFI) queues 316), and may trigger inter-processor communication controller (IPCC) interrupts (the IPCC may be a centralized block for managing inter-processor interrupts at the SoC level) at the GPU 312 via the IPCC 318 at regular intervals when the LSR workload is ready for processing by the GPU 312.

For the LSR use case, the GPU 312 may be reserved, and may act as a fixed function block. Moreover, in the LSR context, the graphics management unit (GMU) 314 within the GPU 312 may always be active, and may monitor for the IPCC interrupts from the EVA firmware 308 (in other words, the GMU 314 and the EVA firmware 308 may communicate using the IPCC interrupts).

There may be performance goals or targets associated with the XR pipeline. For example, the motion-to-render-to-photon ("photon" may refer to a corresponding change on the display such as a head-mounted display (HMD)) latency (i.e., a latency from the companion device to the XR device) may be approximately 50-55 ms. Further, the motion-to-photon latency may be less than 9 ms. Therefore, it may be important to meet the performance goals and at the same time reduce power consumption.

The graphics driver 310 may not disable the clock/regulator of the GMU 314 to bring the GMU 314 into a slumber state because the GMU 314 may always monitor for the IPCC interrupts from the EVA firmware 308. To take advantage of another potential power saving opportunity, the GMU 314 may power collapse the GPU 312 between command submissions (workload submissions) when the GPU 312 is idle. This may be referred to as IFPC. In particular, the IFPC may be a power saving feature where the GPU may be switched off between frames. The IFPC may be controlled by the GMU 314 firmware. Based on the IFPC, the GMU 314 firmware may switch off the GPU even if the GPU is idle for short durations.

Figure 4:
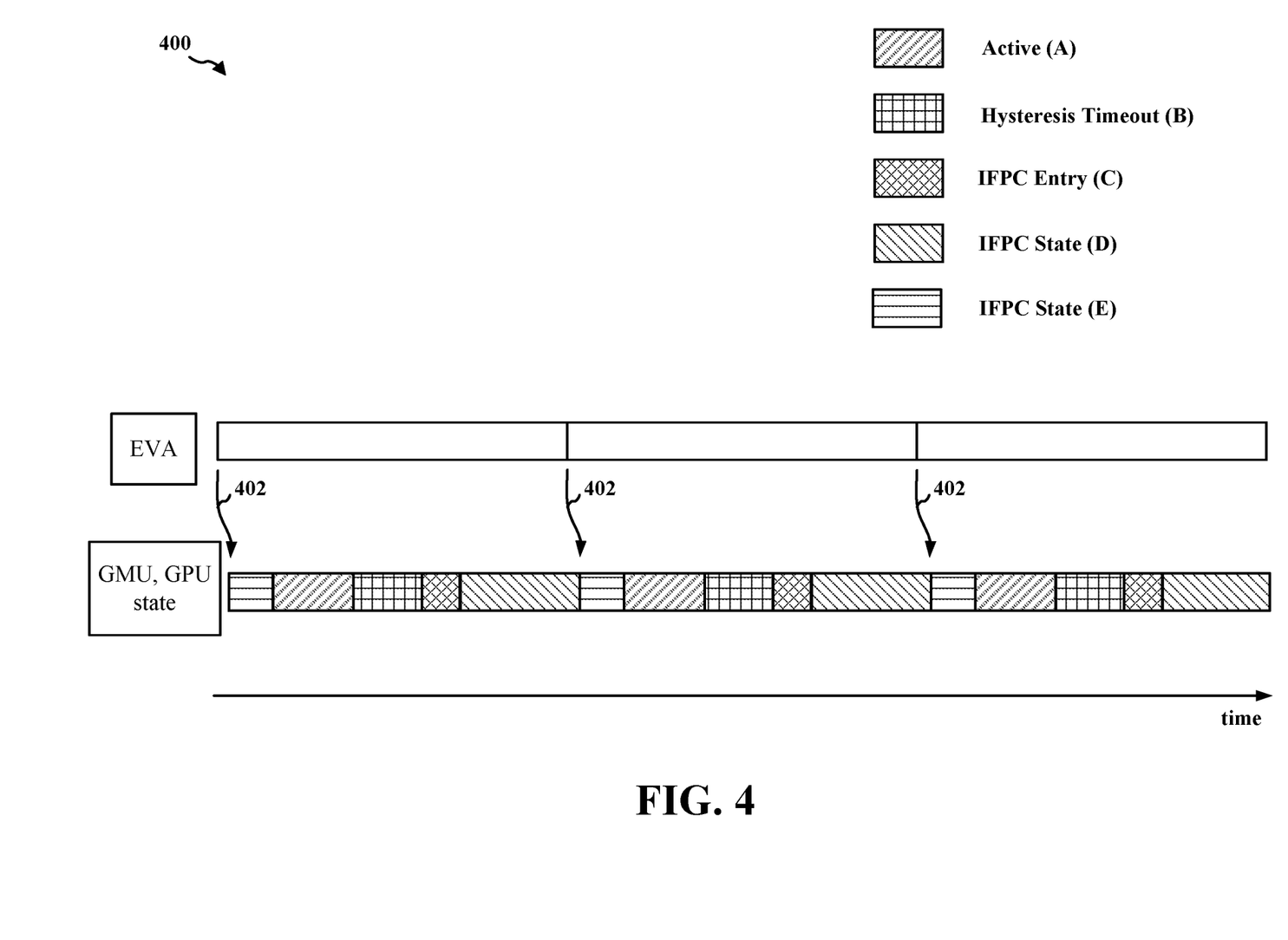
FIG. 4 is a diagram illustrating an example GPU state timeline associated with IFPC according to one or more aspects.

FIG. 4 is a diagram 400 illustrating an example GPU state timeline associated with IFPC according to one or more aspects. If IFPC is enabled, the GPU may be in one of five possible states at any given time: an active state (also referred to as the A state), a hysteresis timeout state (also referred to as the B state), an IFPC entry state (also referred to as the C state), an IFPC state (also referred to as the D state) (when there is no workload for the GPU, the GMU 314 may switch off the clocks and the regulators of the GPU; the GPU may be completely off when in the IFPC state), and an IFPC exit state (also referred to as the E state) (when a new workload is submitted while the GPU is in the IFPC state, the GMU 314 may switch on the clocks and the regulators of the GPU; the IFPC exit state may be a transition state corresponding to the transition from the IFPC state to the active state). In particular, when in the active (A) state, the GPU may process the command submission corresponding to the present sample. The hysteresis timeout (B) state may be a timeout period before starting the IFPC entry (C) state after the GPU becomes idle. The IFPC entry (C) state may correspond to the time it may take for the GMU to switch off the clocks and the regulator of the GPU. When in the IFPC (D) state, the GPU may be completely off. Furthermore, the IFPC exit (E) state may correspond to the time it takes for the GMU to turn on the clocks and the regulator of the GPU. In other words, if IFPC is enabled, there may be latencies associated with the entry into and the exit from the IFPC (D) state.

In one example, as shown in FIG. 4, if IFPC is enabled, upon receipt of an IPCC interrupt 402 from the EVA firmware, the GMU firmware may place the GPU into the IFPC exit (E) state in order to wake the GPU up from the IFPC (D) state. Therefore, the IFPC exit (E) state may represent a delay between the receipt of the IRCC interrupt 402 and the time the GPU becomes awake and ready to process a command. Once the GPU is ready and in the active (A) state, the GPU may process the command associated with the current sample. Once the GPU completes the processing of the command, the GPU may provide a command completion interrupt to the GMU. Next, the GMU may inform the EVA firmware that the MV grid for the current sample is ready by triggering a reverse IPCC interrupt at the EVA firmware.

The hysteresis timeout (B) state may start at the same time that the GPU completes the processing of the command. Once the hysteresis timeout (B) state expires, the GMU may power collapse the GPU by first placing the GPU into the IFPC entry (C) state and then the IFPC (D) state.

The hysteresis timeout (B) state may help to avoid unnecessary IFPC entry and exit sequences if there is any immediate additional workload after the GPU completes the processing of a command. This may be useful, for example, when the GPU receives unpredictable workloads from the CPU.

In an illustrative example, there may be 480 samples per second for the GPU to process. In other words, the interval between two adjacent IPCC interrupts 402 may be approximately 2.08 ms. Based on projections, it may take the GPU 0.22 ms to complete the MV grid generation for each sample. In other words, for each sample, the GPU may be in the active (A) state for approximately 0.22 ms. Further, because the total duration between two adjacent IPCC interrupts 402 may be equal to the sum of the durations associated with all five GPU states, as shown in FIG. 4, and it may be known that 1) the duration of the hysteresis timeout (B) state may be approximately 0.3 ms each, 2) the duration of the IFPC entry (C) state may be approximately 0.1 ms each, and 3) the duration of the IFPC exit (E) state may be approximately 0.08 ms each, it may be calculated that the duration of each instance of the IFPC (D) state in this example may be approximately 1.38 ms. Stated differently, the total GPU rail active duration may be approximately 0.7 ms for each interval between two adjacent IPCC interrupts 402.

Figure 5:
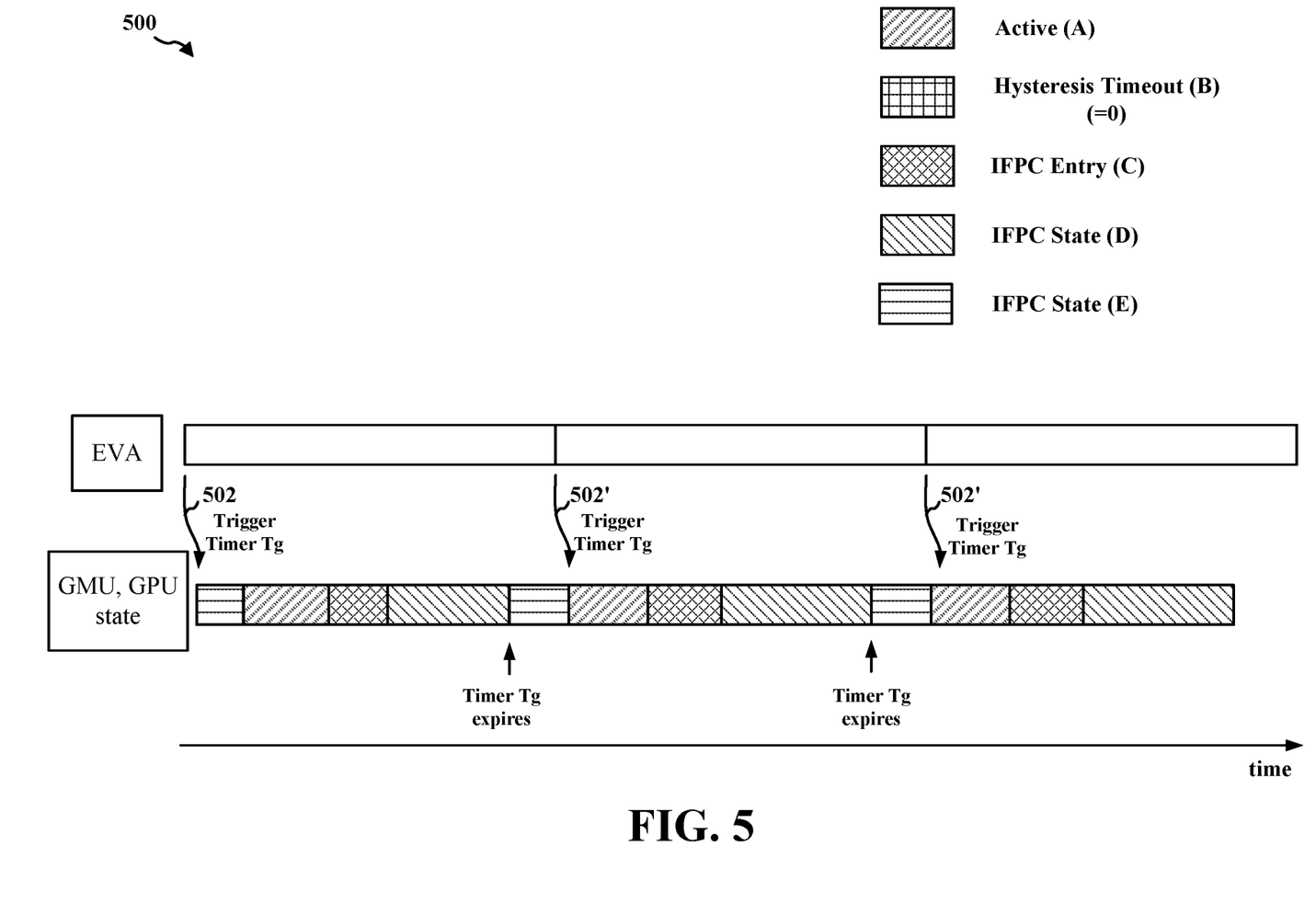
FIG. 5 is a diagram illustrating an example GPU state timeline associated with IFPC according to one or more aspects.

FIG. 5 is a diagram 500 illustrating an example GPU state timeline associated with IFPC according to one or more aspects. In one or more configurations, because the XR workload may be of a persistent type that takes place at fixed intervals throughout the LSR context, additional adaptations as described in further detail below may be adopted to further save power while the XR pipeline performance goals may continue to be met. In particular, referring back to FIG. 3, in one configuration, the XR application 302 may provide a hint corresponding to a timer value (e.g., T1) to the GMU 314 firmware. In another configuration, the hint may be provided by the EVA firmware 308 to the GMU 314 firmware during the LSR context setup. In yet another configuration, the graphics driver 310 or the GMU 314 firmware may derive the hint based on a machine learning technique.

The timer value T1 may relate to the controlling of the flow between the EVA and the GMU, and may correspond to the interval between two adjacent IPCC interrupts 502 sent by the EVA firmware to the GMU firmware. Therefore, in one or more configurations, based on the latency associated with the IFPC exit (E) state, the GMU firmware may trigger or reset a timer (e.g., Tg) immediately upon receiving an IPCC interrupt 502 from the EVA firmware. The value of the timer Tg may be calculated by subtracting the latency associated with the IFPC exit (E) state from the timer value T1, that is, Tg=T1—per instance duration of the E state.

Accordingly, the GMU firmware may start to wake up the GPU upon the expiration of the timer Tg instead of at the receipt of the subsequent IPCC interrupt 502', such that the timeline for waking up the GPU may be advanced and the GPU may be ready in the active (A) state for processing a command approximately at the time the GMU receives the subsequent IPCC interrupt 502'. Therefore, the delay between the receipt of the IPCC interrupt 502' and the time the GPU becomes awake and ready to process a command may be eliminated or at least greatly reduced, and the GPU may start to retrieve and process the command for the current sample immediately after receiving the corresponding IPCC interrupt 502'.

Furthermore, once the timer value T1 is obtained, the GMU may also remove the hysteresis timeout (B) state (i.e., set the hysteresis timeout duration to 0) because it may be known that in the LSR context, there may not be any further immediate GPU workload until the timer Tg expires and the next IPCC interrupt is received.

Because the total duration between two adjacent IPCC interrupts 502 may be equal to the sum of the durations associated with all five GPU states, as shown in FIG. 5, and it may be known that 1) the duration of the hysteresis timeout (B) state may be 0 ms each, 2) the duration of the IFPC entry (C) state may be approximately 0.1 ms each, and 3) the duration of the IFPC exit (E) state may be approximately 0.08 ms each, it may be calculated that the duration of the IFPC (D) state in this example may be approximately 1.68 ms. Stated differently, the total GPU rail active duration may be approximately 0.4 ms for each interval between two adjacent IPCC interrupts 502. Therefore, compared to the timeline shown in FIG. 4, the total GPU rail active duration in FIG. 5 may be reduced by approximately 42%, which may be associated with a corresponding power saving.

Therefore, according to one or more aspects, at least one of the XR application, the EVA driver, or the graphics driver (e.g., a graphics kernel driver) may provide a hint relating to the timer value T1 to the GMU firmware. As a result, hysteresis timeout that is unnecessary for fixed periodical workloads in the LSR context may be avoided. In other words, the GPU may enter the IFPC (D) state immediately after completing the processing of a command. The avoidance of the hysteresis timeout may save power. Furthermore, the waking up of the GPU may start before the IPCC interrupt and the corresponding workload are actually received. Accordingly, the delay in processing commands associated with the delay between the receipt of the IPCC interrupt and the time the GPU becomes awake and ready to process a command may be eliminated. The elimination of the delay may bring about performance benefits.

In one or more configurations, the hint relating to the timer value T1 may be implemented as an extension in the graphics API so that applications (e.g., XR/AR/VR applications) may pass in the timer value T1 (e.g., the interval between workload submissions to the GPU) to the graphics driver (e.g., a graphics kernel driver).

In one or more configurations, in addition to the GMU/GPU, the techniques described above may be similarly applied to other intellectual property (IP) blocks (e.g., video, EVA, etc.) to improve power collapsing operations at the respective IP block.

Figure 6:
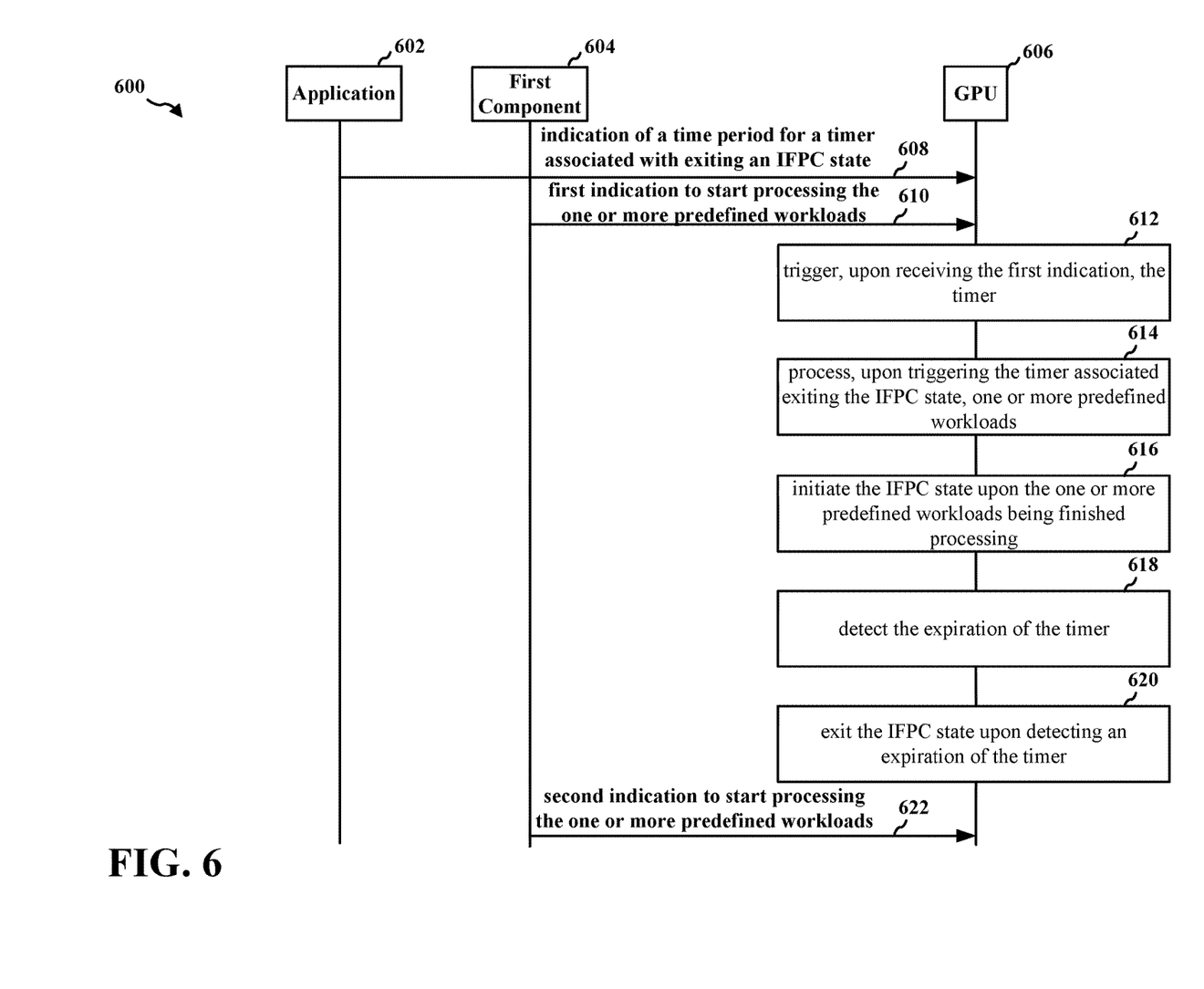
FIG. 6 is a call flow diagram illustrating example communications between an application, a first component, and a GPU in accordance with one or more techniques of this disclosure.

FIG. 6 is a call flow diagram 600 illustrating example communications between an application 602 (e.g., an XR application 302), a first component 604 (e.g., the EVA firmware 308), and a GPU 606 (including a GMU within the GPU 606) in accordance with one or more techniques of this disclosure. At 608, the GPU 606 may receive, from an application 602, an indication of a time period for a timer associated with exiting an IFPC state.

In one configuration, the time period for the timer may be further based at least in part on an IFPC exit latency.

At 610, the GPU 606 may receive a first indication to start processing the one or more predefined workloads. The user space may submit the one or more predefined workloads once to the GPU scheduler (GMU). Further, the GPU scheduler (GMU) may submit the one or more predefined workloads repeatedly to the GPU at regular intervals upon such an event as the IPCC interrupt.

In one configuration, the one or more predefined workloads may be one or more LSR workloads (an LSR workload may be a predefined workload to generate an MV grid based on the depth buffer and the head pose). In further configurations, the one or more predefined workloads may be any workload that may be submitted repeatedly to the GPU.

In one configuration, the first indication may be an IPCC interrupt.

In one configuration, the first indication may be received from at least one of a scheduler, the application, or a service layer.

In one configuration, the one or more predefined workloads may be associated with at least one of an XR application, an AR application, or a VR application.

At 612, the GPU 606 may trigger, upon receiving the first indication, the timer.

At 614, the GPU 606 may process, upon triggering the timer associated with exiting the IFPC state, one or more predefined workloads.

At 616, the GPU 606 may initiate the IFPC state upon the one or more predefined workloads being finished processing.

At 618, the GPU 606 may detect the expiration of the timer.

At 620, the GPU 606 may exit the IFPC state upon detecting an expiration of the timer.

In one configuration, a hysteresis timeout within a first period associated with the timer is zero.

At 622, the GPU 606 may receive a second indication to start processing the one or more predefined workloads.

Figure 7:
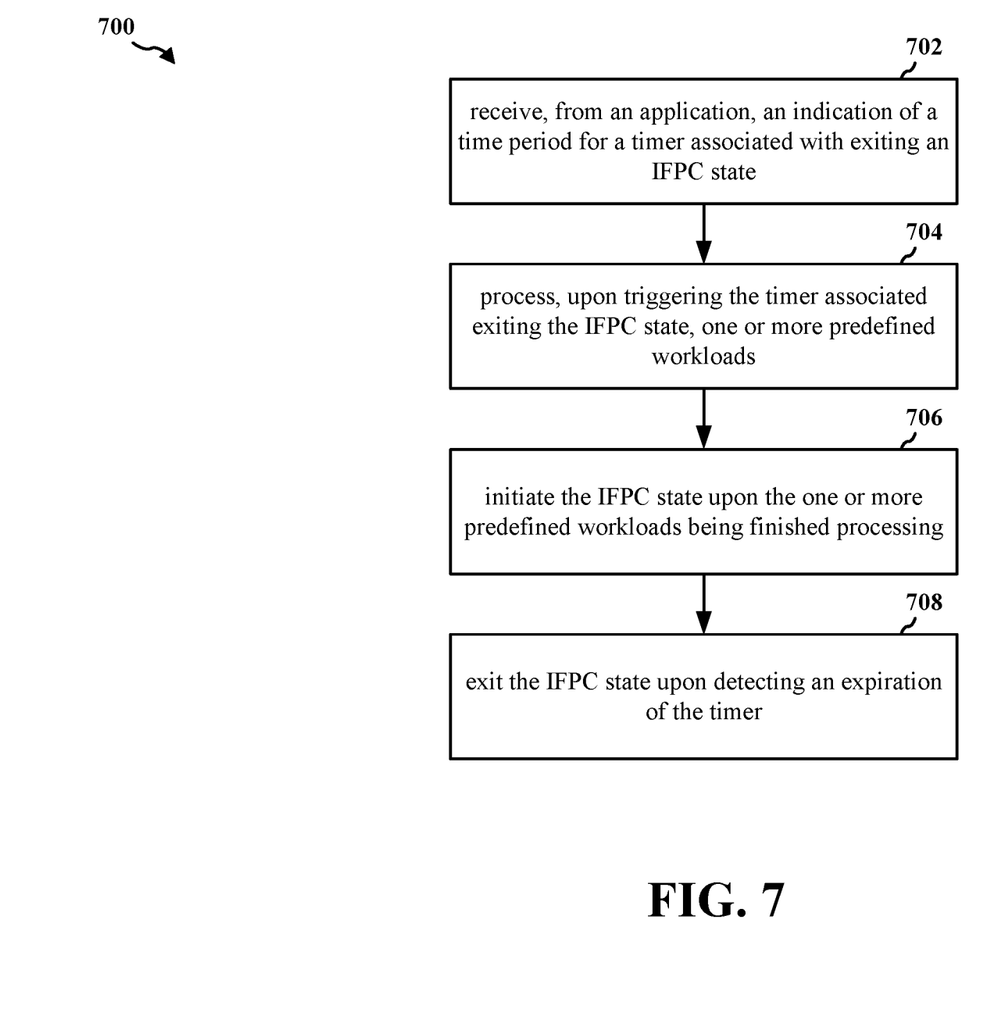
FIG. 7 is a flowchart of an example method of graphics processing in accordance with one or more techniques of this disclosure.

FIG. 7 is a flowchart 700 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1-6.

At 702, the apparatus may receive, from an application, an indication of a time period for a timer associated with exiting an IFPC state. For example, referring to FIG. 6, at 608, the GPU 606 may receive, from an application 602, an indication of a time period for a timer associated with exiting an IFPC state. Further, 702 may be performed by the processing unit 120.

At 704, the apparatus may process, upon triggering the timer associated with exiting the IFPC state, one or more predefined workloads. For example, referring to FIG. 6, at 614, the GPU 606 may process, upon triggering the timer associated with exiting the IFPC state, one or more predefined workloads. Further, 704 may be performed by the processing unit 120.

At 706, the apparatus may initiate the IFPC state upon the one or more predefined workloads being finished processing. For example, referring to FIG. 6, at 616, the GPU 606 may initiate the IFPC state upon the one or more predefined workloads being finished processing. Further, 706 may be performed by the processing unit 120.

At 708, the apparatus may exit the IFPC state upon detecting an expiration of the timer. For example, referring to FIG. 6, at 620, the GPU 606 may exit the IFPC state upon detecting an expiration of the timer. Further, 708 may be performed by the processing unit 120.

Figure 8:
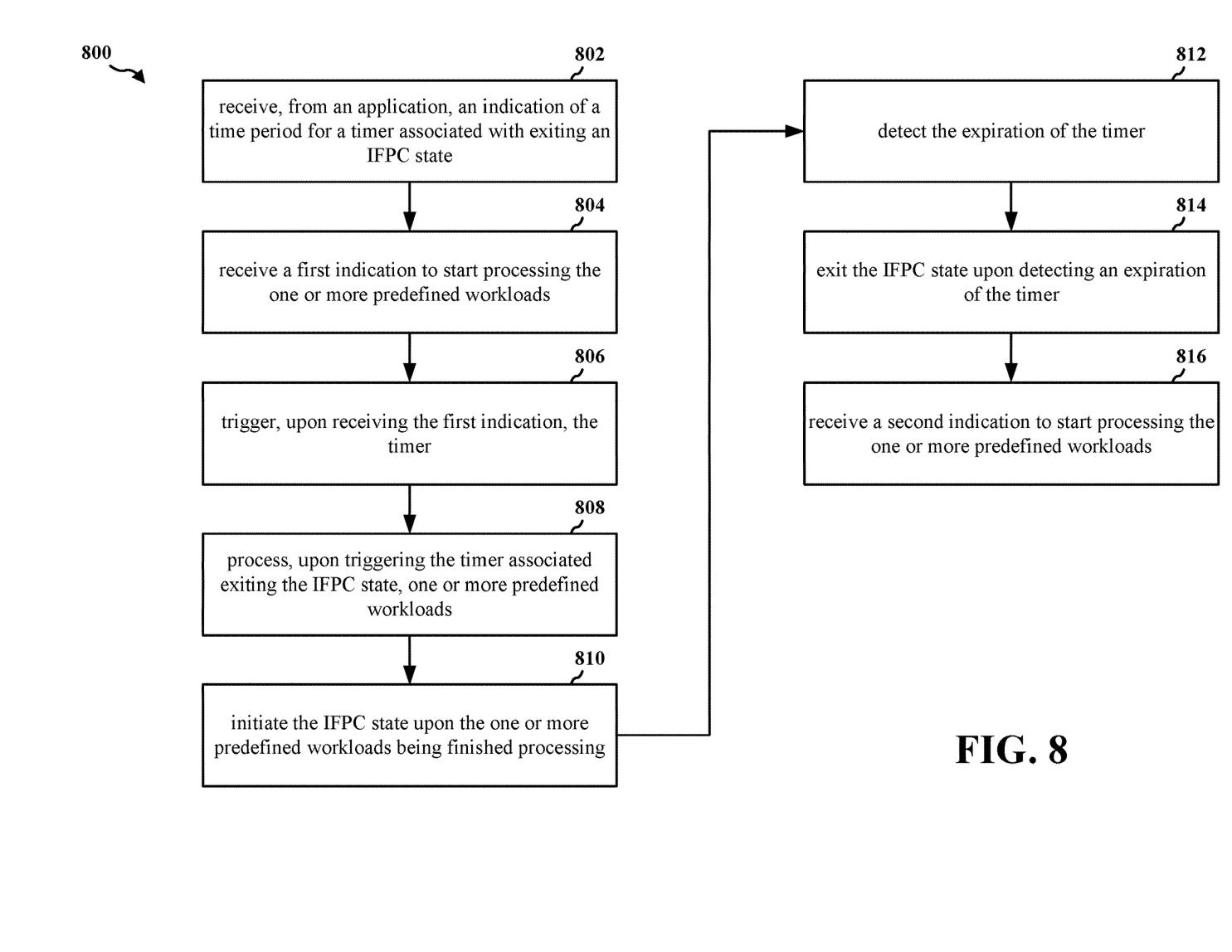
FIG. 8 is a flowchart of an example method of graphics processing in accordance with one or more techniques of this disclosure.

FIG. 8 is a flowchart 800 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1-6.

At 802, the apparatus may receive, from an application, an indication of a time period for a timer associated with exiting an IFPC state. For example, referring to FIG. 6, at 608, the GPU 606 may receive, from an application 602, an indication of a time period for a timer associated with exiting an IFPC state. Further, 802 may be performed by the processing unit 120.

At 808, the apparatus may process, upon triggering the timer associated with exiting the IFPC state, one or more predefined workloads. For example, referring to FIG. 6, at 614, the GPU 606 may process, upon triggering the timer associated with exiting the IFPC state, one or more predefined workloads. Further, 808 may be performed by the processing unit 120.

At 810, the apparatus may initiate the IFPC state upon the one or more predefined workloads being finished processing. For example, referring to FIG. 6, at 616, the GPU 606 may initiate the IFPC state upon the one or more predefined workloads being finished processing. Further, 810 may be performed by the processing unit 120.

At 814, the apparatus may exit the IFPC state upon detecting an expiration of the timer. For example, referring to FIG. 6, at 620, the GPU 606 may exit the IFPC state upon detecting an expiration of the timer. Further, 814 may be performed by the processing unit 120.

In one configuration, at 804, the apparatus may receive a first indication to start processing the one or more predefined workloads. For example, referring to FIG. 6, at 610, the GPU 606 may receive a first indication to start processing the one or more predefined workloads. Further, 804 may be performed by the processing unit 120.

At 806, the apparatus may trigger, upon receiving the first indication, the timer. For example, referring to FIG. 6, at 612, the GPU 606 may trigger, upon receiving the first indication, the timer. Further, 806 may be performed by the processing unit 120.

At 812, the apparatus may detect the expiration of the timer. For example, referring to FIG. 6, at 618, the GPU 606 may detect the expiration of the timer. Further, 812 may be performed by the processing unit 120.

In one configuration, the one or more predefined workloads may be one or more LSR workloads.

In one configuration, the first indication may be an IPCC interrupt.

In one configuration, the first indication may be received from at least one of a scheduler, the application, or a service layer.

In one configuration, the one or more predefined workloads may be associated with at least one of an XR application, an AR application, or a VR application.

In one configuration, at 816, the apparatus may receive a second indication to start processing the one or more predefined workloads. For example, referring to FIG. 6, at 622, the GPU 606 may receive a second indication to start processing the one or more predefined workloads. Further, 816 may be performed by the processing unit 120.

In one configuration, referring to FIG. 6, exiting the IFPC state upon detecting an expiration of the timer may include exiting the IFPC state at the GPU 606.

In one configuration, the time period for the timer may be further based at least in part on an IFPC exit latency.

In one configuration, a hysteresis timeout within a first period associated with the timer may be zero.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for receiving, from an application, an indication of a time period for a timer associated with exiting an IFPC state. The apparatus may further include means for processing, upon triggering the timer associated with exiting the IFPC state, one or more predefined workloads. The apparatus may further include means for initiating the IFPC state upon the one or more predefined workloads being finished processing. The apparatus may further include means for exiting the IFPC state upon detecting an expiration of the timer.

In one configuration, the apparatus may further include means for receiving a first indication to start processing the one or more predefined workloads. The apparatus may further include means for triggering, upon receiving the first indication, the timer. The apparatus may further include means for detecting the expiration of the timer. In one configuration, the one or more predefined workloads may be one or more LSR workloads. In one configuration, the first indication may be an IPCC interrupt. In one configuration, the first indication may be received from at least one of a scheduler, the application, or a service layer. In one configuration, the one or more predefined workloads may be associated with at least one of an XR application, an AR application, or a VR application. In one configuration, the apparatus may further include means for receiving a second indication to start processing the one or more predefined workloads. In one configuration, exiting the IFPC state upon detecting an expiration of the timer may include exiting the IFPC state at the GPU. In one configuration, the time period for the timer may be further based at least in part on an IFPC exit latency. In one configuration, a hysteresis timeout within a first period associated with the timer may be zero.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing, comprising: receiving, from an application, an indication of a time period for a timer associated with exiting an IFPC state; processing, upon triggering the timer associated with exiting the IFPC state, one or more predefined workloads; initiating the IFPC state upon the one or more predefined workloads being finished processing; and exiting the IFPC state upon detecting an expiration of the timer.

Aspect 2 may be combined with aspect 1 and further includes receiving a first indication to start processing the one or more predefined workloads; triggering, upon receiving the first indication, the timer; and detecting the expiration of the timer.

Aspect 3 may be combined with aspect 2 and includes that the one or more predefined workloads are one or more LSR workloads.

Aspect 4 may be combined with any of aspects 2 and 3 and includes that the first indication is an IPCC interrupt.

Aspect 5 may be combined with any of aspects 2-4 and includes that the first indication is received from at least one of a scheduler, the application, or a service layer.

Aspect 6 may be combined with any of aspects 2-5 and includes that the one or more predefined workloads are associated with at least one of an XR application, an AR application, or a VR application.

Aspect 7 may be combined with any of aspects 2-6 and further includes receive a second indication to start processing the one or more predefined workloads.

Aspect 8 may be combined with any of aspects 1-7 and includes that exiting the IFPC state upon detecting the expiration of the timer includes exiting the IFPC state at a GPU.

Aspect 9 may be combined with any of aspects 1-8 and includes that the time period for the timer is further based at least in part on an IFPC exit latency.

Aspect 10 may be combined with any of aspects 1-9 and includes that a hysteresis timeout within a first period associated with the timer is zero.

Aspect 11 is an apparatus for graphics processing including at least one processor coupled to a memory and configured to implement a method as in any of aspects 1-10.

Aspect 12 may be combined with aspect 11 and includes that the apparatus is a wireless communication device.

Aspect 13 is an apparatus for graphics processing including means for implementing a method as in any of aspects 1-10.

Aspect 14 is a non-transitory computer-readable medium storing computer executable code, the code when executed by at least one processor causes the at least one processor to implement a method as in any of aspects 1-10.

Various aspects have been described herein. These and other aspects are within the scope of the following claims.

What is claimed is:

1. An apparatus for graphics processing, comprising:
a memory; and
at least one processor coupled to the memory and configured to:

receive, from an application, an indication of a time period for a timer associated with exiting an inter-frame power collapse (IFPC) state;

process, upon triggering the timer associated with exiting the IFPC state, one or more predefined workloads;

initiate the IFPC state upon the one or more predefined workloads being finished processing; and exit the IFPC state upon detecting an expiration of the timer.

2. The apparatus of claim 1, the at least one processor being further configured to:

receive a first indication to start processing the one or more predefined workloads;

trigger, upon receiving the first indication, the timer; and detect the expiration of the timer.

3. The apparatus of claim 2, wherein the one or more predefined workloads are one or more late stage reprojection (LSR) workloads.

4. The apparatus of claim 2, wherein the first indication is an inter-processor communication controller (IPCC) interrupt.

5. The apparatus of claim 2, wherein to receive the first indication, the at least one processor is configured to receive the first indication from at least one of a scheduler, the application, or a service layer.

6. The apparatus of claim 2, wherein the one or more predefined workloads are associated with at least one of an extended reality (XR) application, an augmented reality (AR) application, or a virtual reality (VR) application.

7. The apparatus of claim 2, the at least one processor being further configured to:

receive a second indication to start processing the one or more predefined workloads.

8. The apparatus of claim 1, wherein the at least one processor is further configured to exit the IFPC state at a graphics processing unit (GPU).

9. The apparatus of claim 1, wherein the time period for the timer is further based at least in part on an IFPC exit latency.

10. The apparatus of claim 1, wherein a hysteresis timeout within a first period associated with the timer is zero.

11. The apparatus of claim 1, wherein the apparatus is a wireless communication device.

12. A method of graphics processing, comprising:

receiving, from an application, an indication of a time period for a timer associated with exiting an inter-frame power collapse (IFPC) state;

processing, upon triggering the timer associated with exiting the IFPC state, one or more predefined workloads;

initiating the IFPC state upon the one or more predefined workloads being processed; and exiting the IFPC state upon detecting an expiration of the timer.

13. The method of claim 12, further comprising:

receiving a first indication to start processing the one or more predefined workloads;

triggering, upon receiving the first indication, the timer; and detecting the expiration of the timer.

14. The method of claim 13, wherein the one or more predefined workloads are one or more late stage reprojection (LSR) workloads.

15. The method of claim 13, wherein the first indication is an inter-processor communication controller (IPCC) interrupt.

16. The method of claim 13, wherein the first indication is received from at least one of a scheduler, the application, or a service layer.

17. The method of claim 13, wherein the one or more predefined workloads are associated with at least one of an extended reality (XR) application, an augmented reality (AR) application, or a virtual reality (VR) application.

18. The method of claim 13, further comprising:

receiving a second indication to start processing the one or more predefined workloads.

19. The method of claim 12, wherein exiting the IFPC state upon detecting the expiration of the timer further comprises exiting the IFPC state at a graphics processing unit (GPU).

20. The method of claim 12, wherein the time period for the timer is further based at least in part on an IFPC exit latency.

21. The method of claim 12, wherein a hysteresis timeout within a first period associated with the timer is zero.

22. A non-transitory computer-readable medium storing computer executable code, the code when executed by at least one processor, causes the at least one processor to:

receive, from an application, an indication of a time period for a timer associated with exiting an inter-frame power collapse (IFPC) state;

process, upon triggering the timer associated with exiting the IFPC state, one or more predefined workloads;

initiate the IFPC state upon the one or more predefined workloads being finished processing; and exit the IFPC state upon detecting an expiration of the timer.

23. The non-transitory computer-readable medium of claim 22, the code further causing the at least one processor to:

receive a first indication to start processing the one or more predefined workloads;

trigger, upon receiving the first indication, the timer; and detect the expiration of the timer.

24. The non-transitory computer-readable medium of claim 23, wherein the one or more predefined workloads are one or more late stage reprojection (LSR) workloads.

25. The non-transitory computer-readable medium of claim 23, wherein the first indication is an inter-processor communication controller (IPCC) interrupt.

26. The non-transitory computer-readable medium of claim 23, wherein the first indication is received from at least one of a scheduler, the application, or a service layer.

27. The non-transitory computer-readable medium of claim 23, wherein the one or more predefined workloads are associated with at least one of an extended reality (XR) application, an augmented reality (AR) application, or a virtual reality (VR) application.

28. The non-transitory computer-readable medium of claim 23, the code further causing the at least one processor to:

receive a second indication to start processing the one or more predefined workloads.

29. The non-transitory computer-readable medium of claim 22, wherein exiting the IFPC state upon detecting the expiration of the timer further comprises exiting the IFPC state at a graphics processing unit (GPU).

30. The non-transitory computer-readable medium of claim 22, wherein the time period for the timer is further based at least in part on an IFPC exit latency.

* * * * *